(12) United States Patent
Morning-Smith et al.

(10) Patent No.: US 9,921,916 B2
(45) Date of Patent: Mar. 20, 2018

(54) MANAGEMENT OF POWER LOSS IN A MEMORY DEVICE

(71) Applicant: INTEL CORPORATION, Santa Clara, CA (US)

(72) Inventors: Andrew Morning-Smith, Vancouver (CA); Adrian Mocanu, Langley (CA); Zeljko Zupanc, Vancouver (CA); Mike M. Ngo, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 131 days.

(21) Appl. No.: 14/975,272

(22) Filed: Dec. 18, 2015

(65) Prior Publication Data
US 2017/0177374 A1    Jun. 22, 2017

(51) Int. Cl.
*G06F 11/14*    (2006.01)
*G06F 13/40*    (2006.01)

(52) U.S. Cl.
CPC ...... *G06F 11/1441* (2013.01); *G06F 13/4022* (2013.01)

(58) Field of Classification Search
CPC ........ G06F 1/30; G06F 1/305; G06F 11/1441; G11C 5/141; G11C 5/143; G11C 5/144
USPC .................................................... 714/14, 22
See application file for complete search history.

(56) References Cited

U.S. PATENT DOCUMENTS

| | | | | |
|---|---|---|---|---|
| 3,757,302 A | * | 9/1973 | Pollitt | G01R 19/16547 361/71 |
| 7,983,107 B2 | * | 7/2011 | Moshayedi | G11O 5/04 365/189.05 |
| 8,060,781 B2 | * | 11/2011 | Ishikawa | G06F 11/1441 714/22 |
| 8,325,554 B2 | | 12/2012 | Sweere et al. | |
| 8,693,276 B2 | | 4/2014 | Lai et al. | |
| 8,719,629 B2 | | 5/2014 | Wilson | |
| 8,874,278 B2 | * | 10/2014 | Kitakawa | G06F 1/30 700/297 |
| 9,082,472 B2 | | 7/2015 | Ahn | |
| 2013/0135945 A1 | | 5/2013 | Liu et al. | |

OTHER PUBLICATIONS

International Search Report and Written Opinion for International Application No. PCT/US2016/062842, dated Feb. 23, 2017, 11 pp.

\* cited by examiner

*Primary Examiner* — Joseph R Kudirka
(74) *Attorney, Agent, or Firm* — Konrad Raynes Davda & Victor LLP; Rabindranath Dutta (57) ABSTRACT

Provided is a memory device, comprising a non-volatile memory, an energy store coupled to an input power module of the non-volatile memory, and a power management module configurable to determine whether or not to supply backup power to the non-volatile memory via the energy store to initiate a shutdown process, based on differentiating a voltage glitch from an actual loss of power in a power line. Provided also is a computational device that includes the memory device. Provided also is a method in which a power management module of the memory device determines whether or not to supply backup power to the non-volatile memory via the energy store to initiate a shutdown process, based on differentiating a voltage glitch from an actual loss of power in a power line.

19 Claims, 9 Drawing Sheets

MANAGEMENT OF POWER LOSS IN A MEMORY DEVICE

BACKGROUND

A solid state drive (SSD) is a data storage device that uses integrated circuit assemblies as memory to store data persistently. The SSD may be coupled to a host computing system, such as a personal computer or a server, where the host computing system performs input/output (I/O) operations on the SSD, and where the I/O operations may include writing data to the SSD and reading data from the SSD. The host computing system may also provide power to the SSD.

A metal oxide semiconductor field effect transistor (MOSFET) is a type of transistor used for switching electronic signals. A switch may use a MOSFET based circuitry, or circuitry based on other mechanisms, to control the supply of power to electronic components.

BRIEF DESCRIPTION OF THE DRAWINGS

Referring now to the drawings in which like reference numbers represent corresponding parts throughout.

DETAILED DESCRIPTION

In the event of a power loss, a non-volatile memory device, such as a SSD, may have to perform a controlled shutdown for saving "in-flight data". "In-flight data" refers to writes sent to the SSD from a host, where the writes have not yet been committed to the non-volatile memory of the SSD. "In-flight data" also refers to any write that is in progress and as a result is not yet complete. Additionally, "in-flight data" may also refer to data that has been temporarily buffered or cached in volatile memory, acknowledged as written back to the host, but not yet committed to the non-volatile memory of the SSD. "In-flight data" may also include data management structures that are stored in volatile memory.

In addition to saving the "in-flight data", the controlled shutdown may have to ramp down the voltages in the input power rails of the memory device in an orderly sequence, where the input power rails supply power to the memory device. The controlled shutdown may avoid data corruption or damage in the SSD.

In order to support the controlled shutdown in the event of a power loss, a power management module of a SSD may isolate the power supply of the SSD from the host through the use of isolating switches (e.g., MOSFETs or other types of devices) that are used on the input power rail. After isolating the power supply of the SSD from the host, the power management module of the SSD may use an internal energy store (e.g., a capacitor that stores charge) of the SSD to supply backup power for a shutdown process in the SSD, where the shutdown process saves the in-flight data and may perform other operations.

An input voltage trigger may detect a preset voltage level in the input voltage supplied to the SSD. In certain solutions, if the input voltage trigger is an extremely fast input voltage trigger for detecting power loss, then the solution allows the SSD to support fast ramp downs (e.g., "crowbar") of the input power rail, but leaves the SSD susceptible to false triggering when short voltage glitches occur, where the short voltage glitches may lead to a momentary drop in voltage level followed by a restoration of appropriate voltage level. As a result, the SSDs may be spuriously reset in noisy systems that have frequent short voltage glitches. It should be noted that "crowbar" is just an example of one type of fast ramp down, and other types of fast ramp downs are also included in the embodiments described herein.

If the input voltage trigger is a slow filtered trigger, then the solution allows the SSD to be immune to short voltage glitches but does not protect the SSD against fast ramp downs and the in-flight data to be stored in the SSD may be corrupted in the event of a fast ramp down of the voltage in the input power rail.

Certain embodiments improve the responsiveness of a SSD to systems that ramp down the power supply very quickly (e.g., systems that "crowbar" the power supply), while at the same time the embodiments maintain tolerance for short glitches in the supply voltage. It is not straightforward to combine the fast input voltage trigger with the slow filtered trigger, because the fast input voltage trigger and slow filtered trigger are mutually exclusive. Certain embodiments, provide a two stage mechanism. In a first stage, a fast but reversible trigger prevents discharge of the SSD's input capacitors to a quickly ramping down input power rail. In a second stage, a filtered trigger initiates the power loss response.

Therefore, certain embodiments provide a power management module that is configurable to determine whether or not to supply backup power to a non-volatile memory via an energy store such as a capacitor for saving the in-flight data and for performing other operations, based on differentiating a voltage glitch from an actual loss of power in a power line from a host to the non-volatile memory.

Although various embodiments are described with respect to SSD, embodiments may be applied to any memory devices that comprise non-volatile memory. In one embodiment, the nonvolatile memory device is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), magnetoresistive random access memory (MRAM) memory that incorporates memristor technology, or spin transfer torque (STT)-MRAM, a spintronic magnetic junction memory based device, or a combination of any of the above, or other memory. The memory device may refer to the die itself and/or to a packaged memory product.

In the following description, reference is made to the accompanying drawings which form a part hereof and which illustrate several embodiments. It is understood that other embodiments may be utilized and structural and operational changes may be made.

Figure 1:
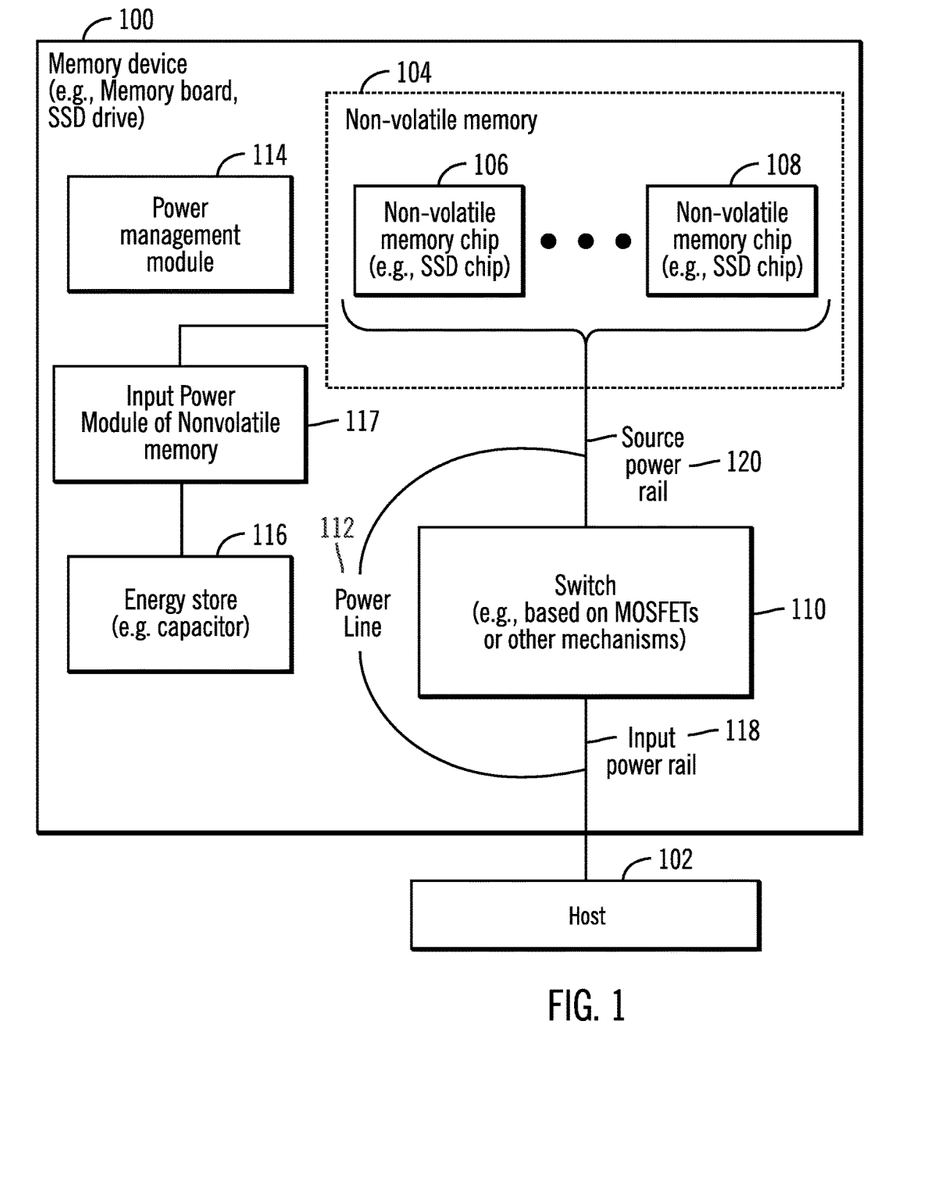
FIG. 1 illustrates a block diagram of a memory device coupled to a host, in accordance with certain embodiments.

FIG. 1 illustrates a block diagram of a memory device 100 coupled to a host 102, in accordance with certain embodiments. The memory device 100 may comprise a memory board, a SSD, or any other device that includes non-volatile memory 104. In certain embodiments, the non-volatile memory 104 may be comprised of a plurality of non-volatile memory chips 106, 108. Other configurations of the memory device 100 are possible in alternative embodiments, as long as the memory device 100 includes non-volatile memory whose in-flight data needs to be preserved in the event of a loss of power provided by the host 102 or some other device.

In certain embodiments, the host 102 may be a computational device (e.g., a laptop computer, a desktop computer, a tablet, a cell phone, a processor, a server, a disk array, or any other suitable computational device), and the memory device 100 may be included inside or may be located outside the computational device 102.

The memory device 100 includes a switch 110 that is positioned in a power line 112 that supplies power to the memory device 100 from the host 102. The switch 110 may be based on MOSFETs or may be fabricated via other mechanisms. Descriptions herein referring to a MOSFET may correspond to any type of switch. The power line 112 is comprised of an input power rail 118 that transmits power from the host 102 to the switch 110 and a source power rail 120 that transmits power from the switch 110 to the non-volatile memory 104. There may be a single instance of an input power rail, a power line, and a source power rail, or there may be one or more instances of input power rails, power lines, and source power rails (e.g., in certain embodiments a plurality of input power rails may feed a plurality of source power rails).

If power is lost from the host 102, then a power management module 114 of the memory device 100 may use an energy store 116 (e.g., a capacitor that stores charge) included in the memory device 100 to supply backup power to the non-volatile memory 104, so that in-flight data is saved via a controlled shutdown of the memory device 100. The energy store 116 is coupled to the non-volatile memory 104 via an input power module 117 of the non-volatile memory 104. The power management module 114 may be implemented in hardware, firmware, software or any combination thereof.

Figure 2:
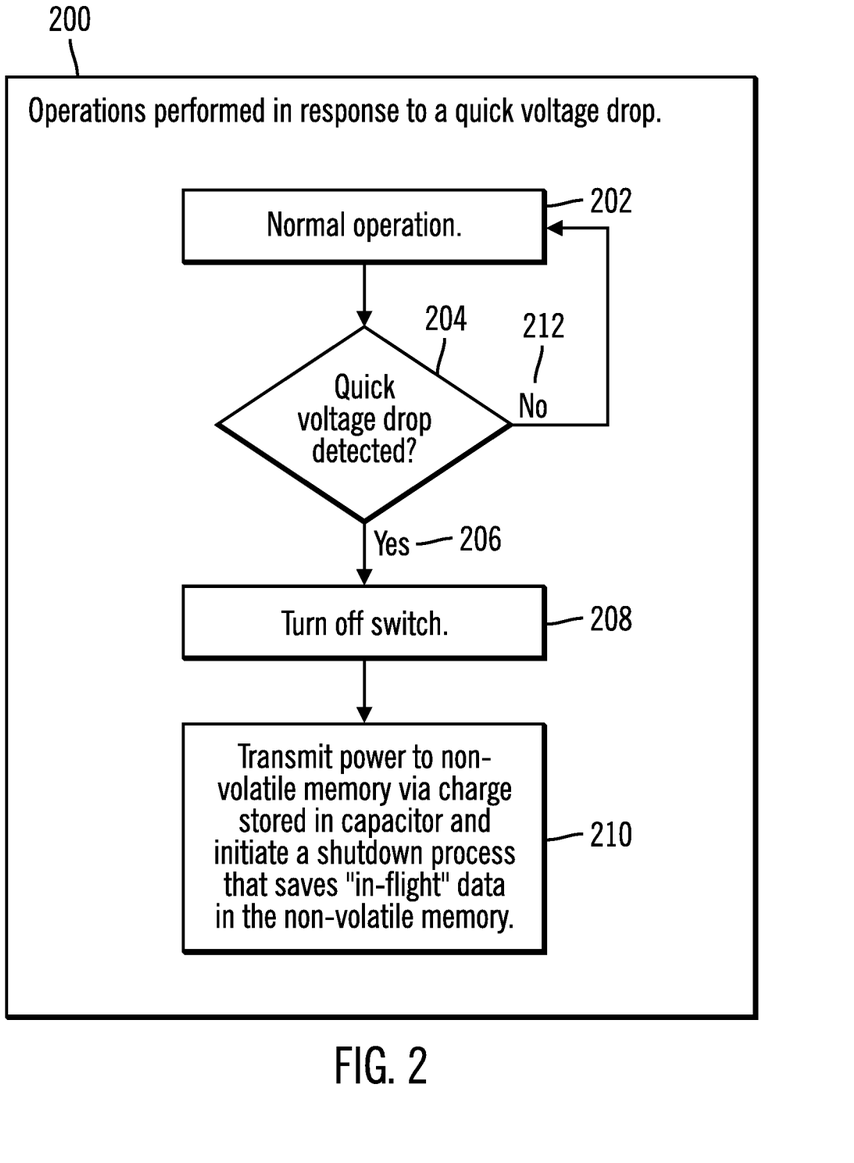
FIG. 2 illustrates a flowchart that shows operations performed in response to detection of a quick voltage drop, in accordance with certain embodiments.

FIG. 2 illustrates a flowchart 200 that shows operations performed in response to a detection of a quick voltage drop in the memory device 100, in accordance with certain embodiments. Control starts at block 202 in which the memory device 100 operates normally. The power management module 114 in cooperation with the switch 110 determines whether a quick voltage drop has been detected (at block 204) in the power line 112. If so ("Yes" branch 206 from block 204), control proceeds to block 208 in which the power management module 114 turns off a switch 110. From block 208 control proceeds to block 210 in which the power management module 114 transmits power to the non-volatile memory 104 via charge stored in the capacitor 116 and initiates a shutdown process that saves the in-flight data in the non-volatile memory 104.

If at block 204, the power management module 114 in cooperation with the switch 110 does not determine ("No" branch 212 from block 204) a quick voltage drop, then control returns to block 202 for continued normal operation of the memory device 100.

In the embodiments shown in FIG. 2, since quick voltage drops are detected at block 204, the memory device 100 may support fast ramp downs (e.g., "crowbar") of voltage in the power line 112, but the memory device 100 may be susceptible to false triggering when short voltage glitches occur. As a result, the memory device 100 may be spuriously reset in noisy systems that have frequent short voltage glitches.

Figure 3:
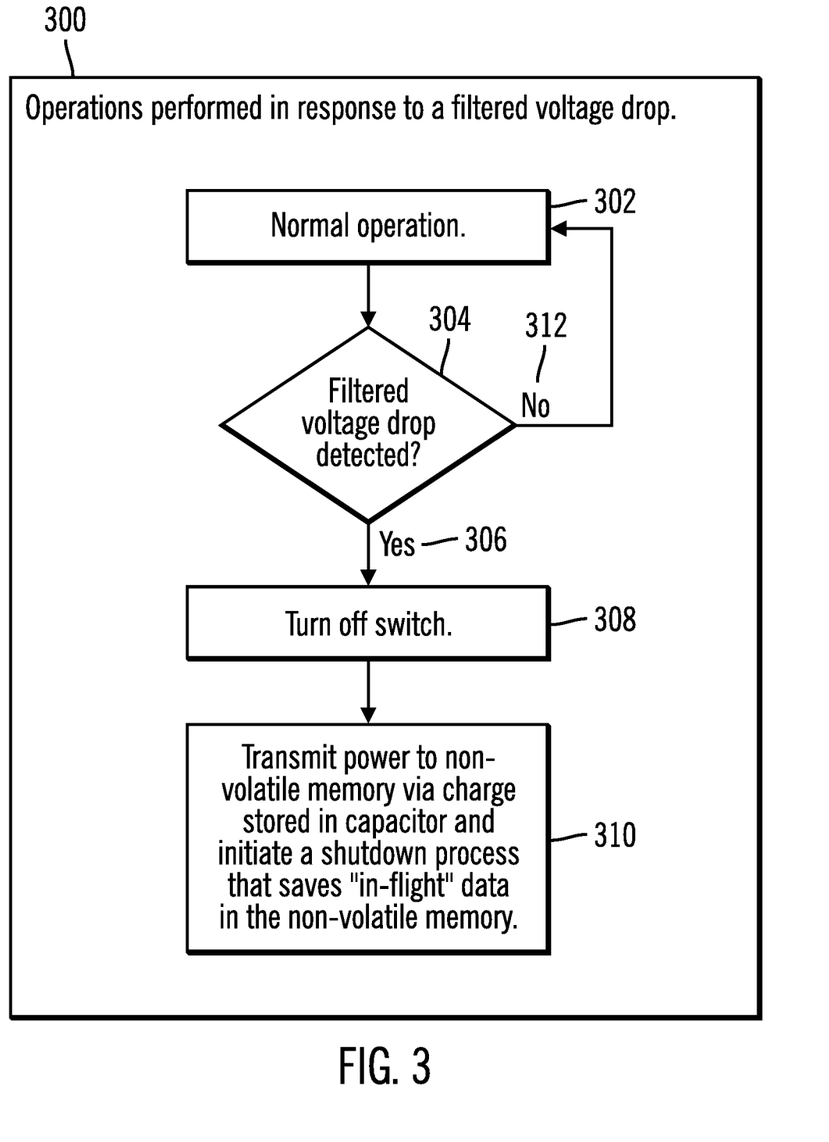
FIG. 3 illustrates a block diagram that shows operations performed in response to detection of a filtered voltage drop, in accordance with certain embodiments.

FIG. 3 illustrates a block diagram 300 that shows operations performed in response to detection of a filtered voltage drop in the memory device 100, in accordance with certain embodiments. The filtered voltage drop is detected in the event of an actual power loss and not in the event of a short voltage glitch. In other words, if the voltage is restored to a suitable level after a momentary drop in the voltage caused by a voltage glitch the filtered voltage drop is not detected.

Control starts at block 302 in which the memory device 100 operates normally. The power management module 114 in cooperation with the switch 110 determines whether a filtered voltage drop has been detected (at block 304) in the power line 112. If so ("Yes" branch 306 from block 304), control proceeds to block 308 in which the power management module 114 turns off the switch 110. From block 308 control proceeds to block 310 in which the power management module 114 transmits power to the non-volatile memory 104 via charge stored in the capacitor 116, and initiates a shutdown process that saves the in-flight data in the non-volatile memory 104.

If at block 304, the power management module 114 in cooperation with the switch 110 does not determine ("No" branch 312 from block 304) a filtered voltage drop, then control returns to block 302 for continued normal operation of the memory device 100.

In the embodiments shown in FIG. 3, since filtered voltage drops are detected at block 304, the memory device 100 is tolerant of short voltage glitches but is unable to protect itself against a fast ramp down of the voltage in the power line 112. In the embodiments shown in FIG. 3, the data stored in the non-volatile memory 104 may be corrupted in the event of a fast ramp down of the voltage in the power line 112, since by the time the filtered voltage drop is detected, power to the non-volatile memory 104 may have been lost and in-flight data may not be recoverable.

Figure 4:
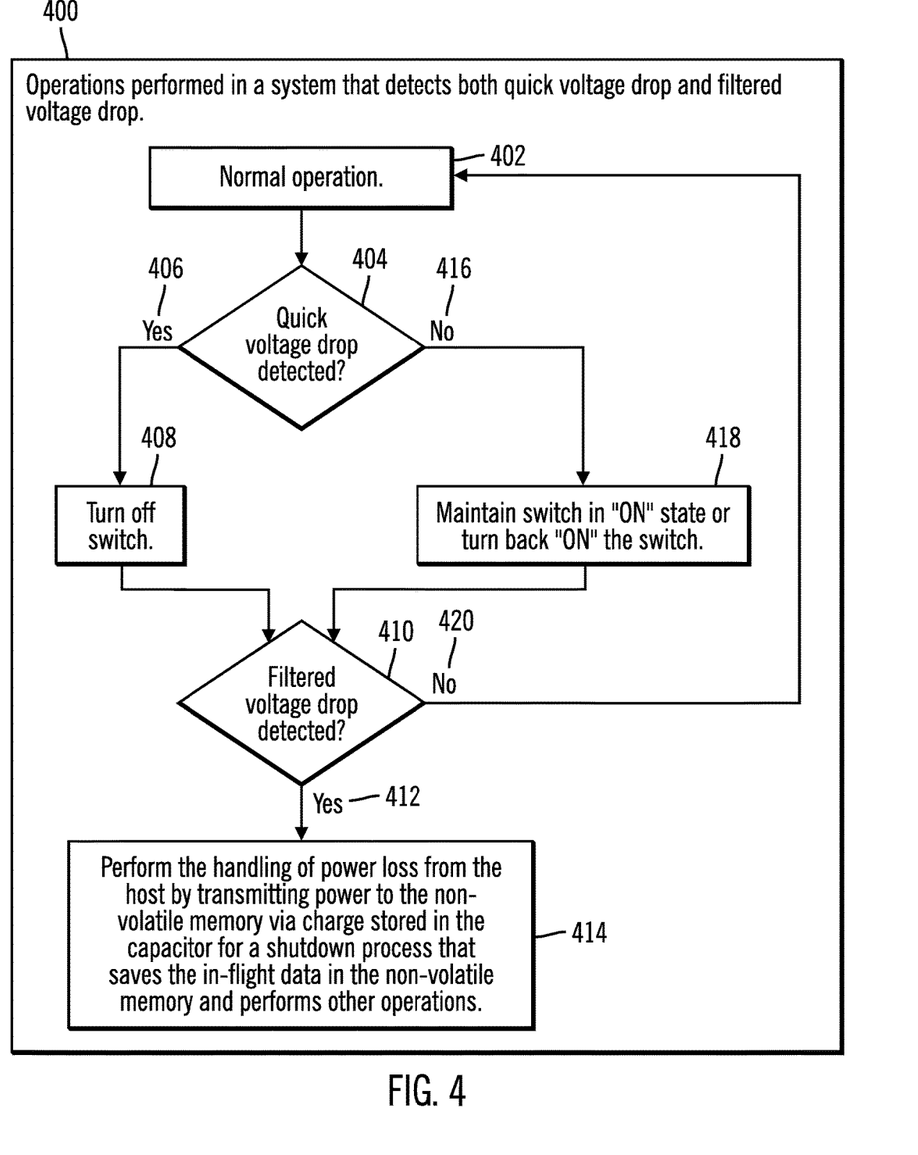
FIG. 4 illustrates a flowchart the shows operations performed in a system that detects both a quick voltage drop and a filtered voltage drop, in accordance with certain embodiments.

FIG. 4 illustrates a flowchart 400 that shows operations performed in a memory device 100 where the memory device 100 is configured to detect both a quick voltage drop and a filtered voltage drop, in accordance with certain embodiments.

Control starts at block 402 in which the memory device 100 operates normally. The power management module 114 in cooperation with the switch 110 determines whether a quick voltage drop has been detected (at block 404) in the power line 112. If so ("Yes" branch 406 from block 404), control proceeds to block 408 in which the power management module 114 turns off the switch 110. If not ("No" branch 416 from block 404) control proceeds to block 418 in which the switch is maintained in an "ON" state (in the "ON" state, the switch is on) or is turned back on.

From blocks 408, 418 control proceeds to block 410 in which the power management module 114 in cooperation with the switch 110 determines whether a filtered voltage drop has been detected. If a filtered voltage drop is detected in block 410 ("Yes" branch 412 from block 410), then the power management module 114 performs (at block 414) the handling of power loss from the host 102, by transmitting power to the non-volatile memory 104 via charge stored in the capacitor 116 for a shutdown process that saves the in-flight data in the non-volatile memory 104 and performs other operations.

If at block 410, the filtered voltage drop is not detected ("No" branch 420 from block 410) then control proceeds to block 402 where the switch 110 continues to operate (at block 402) normally.

Therefore certain embodiments shown in FIG. 4 improve the responsiveness of the memory device 100 to systems that ramp down the power supply very quickly (e.g., system that "crowbar" the power supply), while at the same time maintaining tolerance for short glitches in the supply voltage. A two stage mechanism is provided, in which in a first stage, a fast but reversible trigger prevents discharge of the memory device's capacitors to an input power rail in which voltage is being quickly ramped down, by just turning off the switch 110 (in block 408) but not initiating the power loss response performed in block 414. The power loss response performed by block 414 is initiated in a second stage after detecting a filtered voltage drop.

Therefore, certain embodiments provide a power management module that is configurable to determine whether or not to supply backup power to a non-volatile memory or the memory device via an energy store for saving the in-flight data and for performing other operations, based on differentiating a voltage glitch from an actual loss of power in a power line from a host to the memory device.

On determining a quick voltage drop, a switch 110 in the power line 112 from the host 102 is turned off, but operations to supply backup power via the capacitor 116 and operations to save in-flight data are not initiated. Only after a filtered voltage drop is detected are the operations to supply backup power via the capacitor 116 and save in-flight data initiated. It should be noted that the embodiments shown in FIG. 4, maintains power in the source power rail 120 of the power line 112 for a time interval between the determining of the quick voltage drop (at block 404) and the determining of the actual power loss (at block 410 by detecting the filtered voltage drop that corresponds to an actual power loss).

Figure 5:
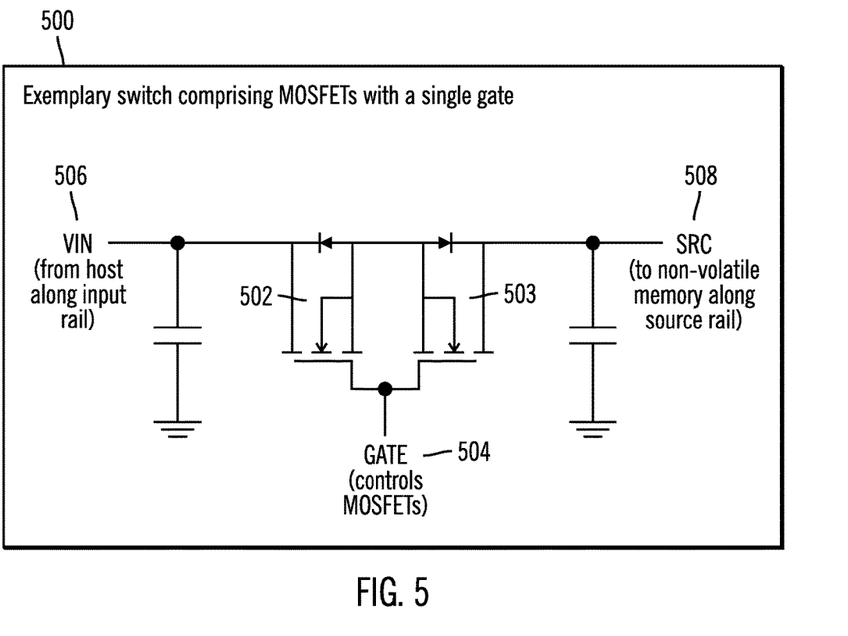
FIG. 5 illustrates a block diagram of a switch comprising two MOSFETs controlled by a single gate, in accordance with certain embodiments.

FIG. 5 illustrates a block diagram of an exemplary switch 500 (may correspond in certain embodiments to the switch 110 shown in FIG. 1) comprising MOSFETs 502, 503 with a single gate 504 that controls the MOSFETs 502, 503, in accordance with certain embodiments. In alternative embodiments, switches that are not based on MOSFETs may be used.

In FIG. 5, VIN 506 indicates the voltage input level in the input power rail 118 to the MOSFET 502, and SRC 508 indicates the voltage output level in the source power rail 120 that transmits power from the MOSFET 503.

In order to support extremely fast input voltage ramp downs (including input "crowbar" and other types of ramp downs) but to still prevent excessive false triggering on short input voltage glitches, an independent control mechanism is provided for the MOSFETs 502, 503.

If a reverse voltage condition occurs (where SRC is greater than VIN, i.e., a voltage glitch leading to a momentary fall in the VIN or a power loss event leading to a permanent fall in the VIN has occurred), the power management module 114 quickly disables the MOSFETs 502, 503 via the gate 504 to preserve energy in the source power rail 120. The power management module 114 does not transmit power to the non-volatile memory 104 via charge stored in the capacitor 116, in response to the quick voltage drop trigger.

If there is a recovery from the reverse voltage condition (i.e., VIN become greater than or equal to SRC because of the rise in the voltage level after a momentary fall in the voltage level caused by a short voltage glitch), then the power management module 114 does not transmit power to the non-volatile memory 104 via charge stored in the capacitor 116, and the MOSFETs 502, 503 are quickly turned back on via the gate 504. The power management module 114 is able to enable or disable the gate 504 within a short time (e.g. 100 ns) of detecting a change in condition, by driving the gate 504 high or low.

Detection of full power loss uses a filter to determine when the input voltage has dropped (short pulses may be held up by the capacitance on the source power rail 120). When a full power loss is triggered, the gate 504 is disabled, and the power management module 114 transmits power to the non-volatile memory 104 via charge stored in the capacitor 116.

Figure 6:
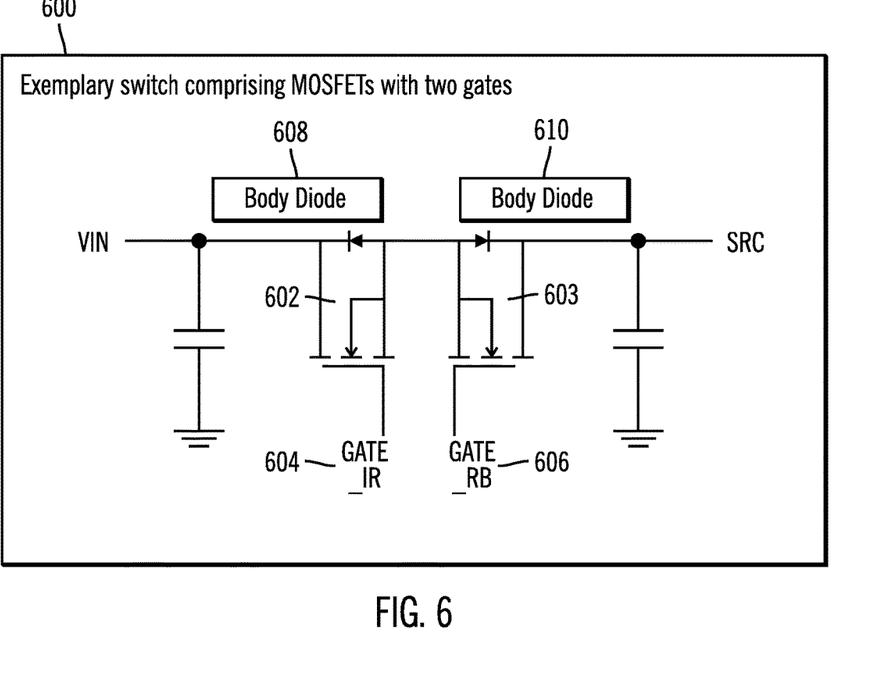
FIG. 6 illustrates a block diagram of a switch comprising two MOSFETs controlled by two gates, in accordance with certain embodiments.

FIG. 6 illustrates a block diagram of a switch 600 (may correspond in certain embodiments to the switch 110 shown in FIG. 1) comprising MOSFETs 602, 603 with two gates 604, 606, in accordance with certain embodiments. Each of the MOSFETs 602, 603 includes a body diode which is a junction diode that lies inside of a MOSFET, where a junction diode is an electronic device that allows the flow of current in one direction only. For example, the body diode 608 is present inside the MOSFET 602 and the body diode 610 is present inside the MOSFET 603.

The gates 604, 606 of the MOSFETs are separated and only one of the two MOSFETs 602, 603 is used for reverse blocking. The gate for the reverse blocking MOSFET (GATE_RB 606 in FIG. 6) is handled in the same manner as the gate 504 described earlier in FIG. 5. In other words, GATE_RB 606 is quickly turned off by the power management module 114, on detecting a reverse voltage condition caused via a quick voltage drop, and is quickly turned on by the power management module 114 on detecting recovery from the reverse voltage condition.

When GATE_RB 606 is turned off, the MOSFET 602 continues to allow current flow in both direction, whereas the MOSFET 603 blocks current from flowing from the source power rail 120 to the input power rail 118, but still allows charging of the source power rail 120 because of the body diode 610 that is always present in the MOSFET 603.

Therefore, in embodiments shown in FIG. 6, the source power rail 120 may recharge more quickly in comparison to the embodiments shown in FIG. 6, if VIN rises back up. However, the embodiments shown in FIG. 6 implement two gates 604, 606 to control the MOSFETs 602, 603 instead of the single gate 504 implemented in FIG. 5 to control the MOSFETs 502, 503. It should be noted that the switches described in FIGS. 1-6 may be MOSFET based or the switches may also be comprised of any other means of connecting and/or disconnecting power.

Each of MOSFETs 602, 603 may also be referred to as isolation switches because each of the MOSFETs 602, 603 are responsible to cut current path (and provide "isolation") in only one direction.

Figure 7:
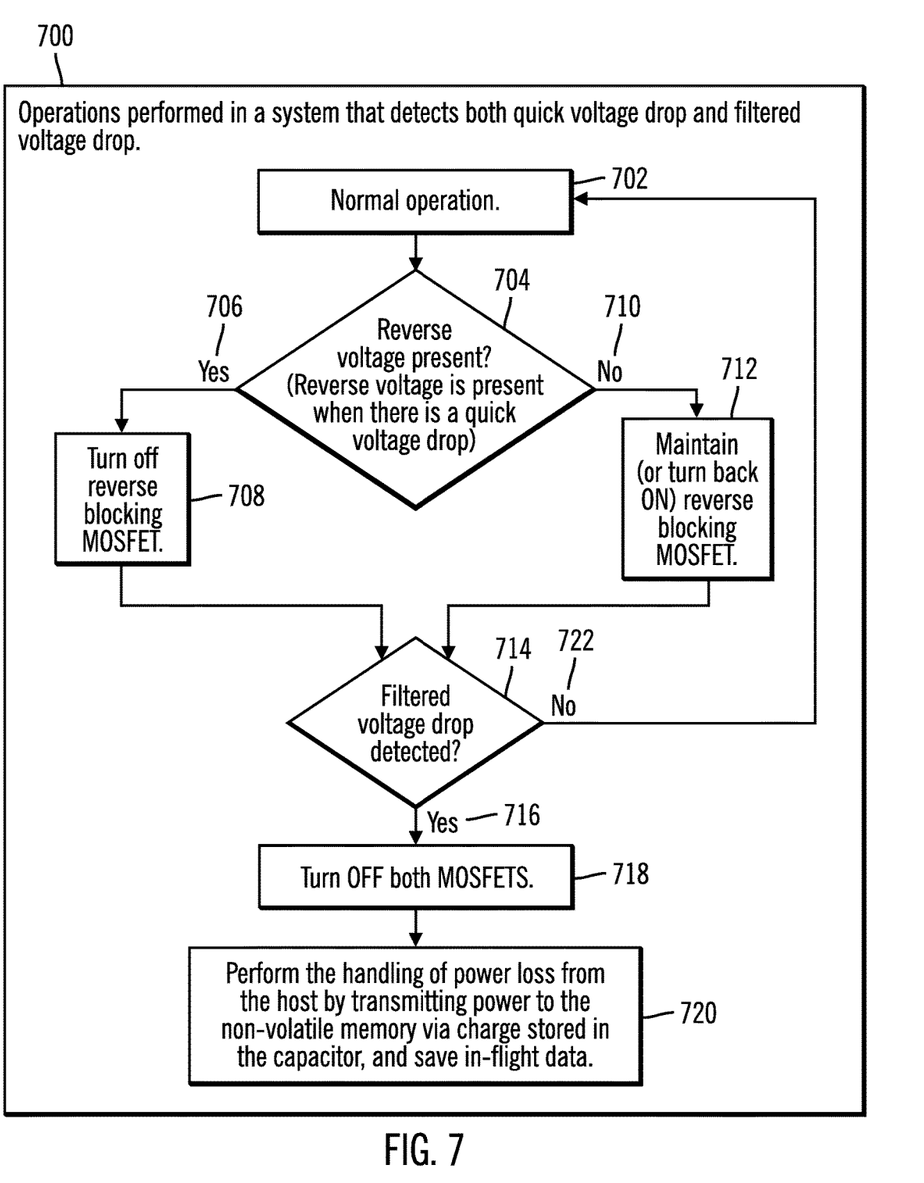
FIG. 7 illustrates a flowchart the shows operations performed by a switch comprising two MOSFETs controlled by two gates, where the switch detects both a quick voltage drop and a filtered voltage drop, in accordance with certain embodiments.

FIG. 7 illustrates a flowchart the shows 700 operations performed by a switch 600 comprising two MOSFETs 602, 603 controlled by two gates 604, 606, where the switch 600 detects both a quick voltage drop and a filtered voltage drop, in accordance with certain embodiments. The switch 600 comprising the two MOSFETs 602, 603 controlled by two gates 604, 606 may also correspond to the switch 110 shown in FIG. 1.

Control starts at block 702 in which the memory device 100 operates normally. The power management module 114 in cooperation with the switch 110 (corresponds to switch 600) determines (at block 704) whether a reverse voltage is present in the switch 110 (corresponds to switch 600), where the reverse voltage is present if there is a quick voltage drop. If so ("Yes" branch 706 from block 704), control proceeds to block 708 in which the power management module 114 turns off the reverse blocking MOSFET 603. If not ("No" branch 710 from block 704) control proceeds to block 712 in which the power management module 114 either maintains or turns back on the reverse blocking MOSFET 603.

From blocks 708, 714 control proceeds to block 714 in which the power management module 114 in cooperation with the switch 110 (corresponds to switch 600) determines whether a filtered voltage drop has been detected 710. If a filtered voltage drop is detected in block 714 ("Yes" branch 716 from block 714), control proceeds to block 716 where both MOSFETs 602, 603 are turned off. Then the power management module 114 performs (at block 720) the handling of power loss from the host 102, by transmitting power to the non-volatile memory 104 via charge stored in the capacitor 116 for initiating a shutdown process that saves the in-flight data in the non-volatile memory 104 and performs other operations.

If at block 714, the filtered voltage drop is not detected ("No" branch 722 from block 714) then control proceeds to block 702 where the switch 110 (corresponds to switch 600) continues to operate (at block 702) normally.

Therefore certain embodiments shown in FIG. 7 improve the responsiveness of the memory device 100 to systems that ramp down the power supply very quickly (e.g., systems that "crowbar" the power supply), while at the same time maintaining tolerance for short glitches in the supply voltage. A two stage mechanism is provided, in which in a first stage, a fast but reversible trigger prevents discharge of the memory device's capacitors to a quickly ramping down of the voltage in the input power rail, by just turning off the switch 600 (in block 708 by turning off the reverse blocking MOSFET 603) but not initiating the power loss response performed in block 718. The power loss response performed by block 720 is initiated in a second stage after detecting a filtered voltage drop in block 714, wherein on detection of the filtered voltage loss both MOSFETs 602, 603 are turned off in block 718.

Figure 8:
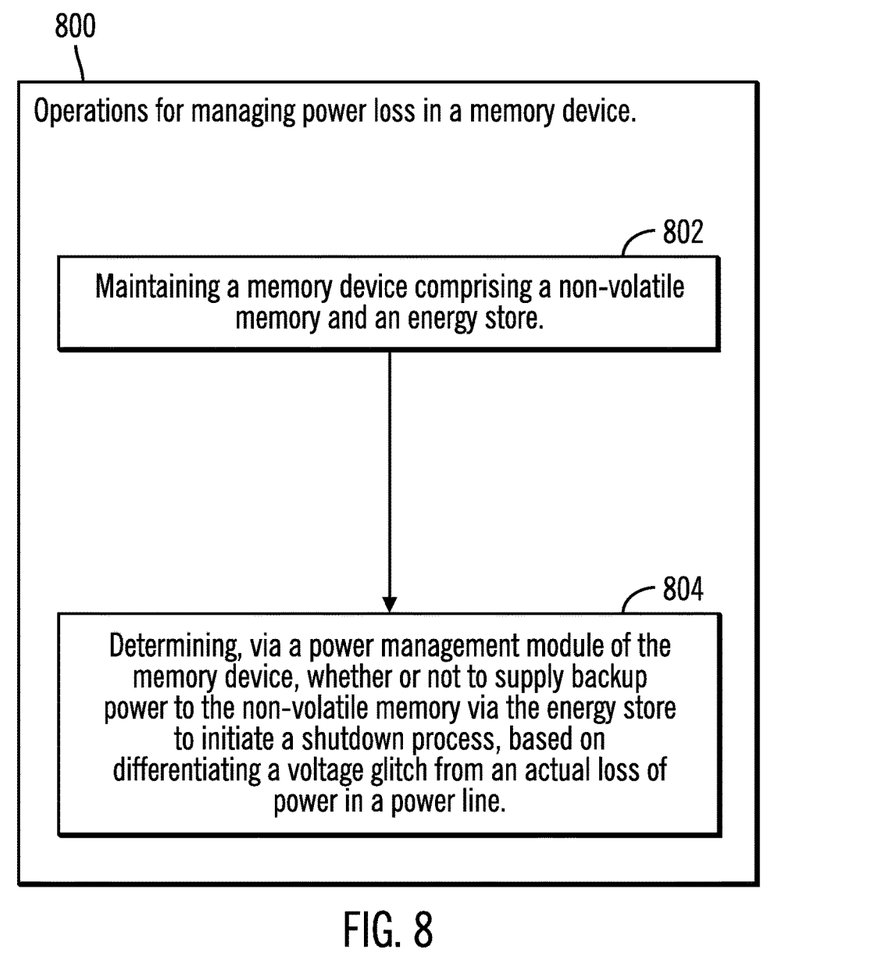
FIG. 8 illustrates a flowchart that shows operations for managing power loss in a memory device, in accordance with certain embodiments.

FIG. 8 illustrates a flowchart 800 that shows operations for managing power loss in a memory device, in accordance with certain embodiments. Control starts at block 802, in which a memory device 100 comprising a non-volatile memory 104 and an energy store 116 is maintained. A power management module 114 of the memory device 100 determines whether or not to supply backup power to the non-volatile memory 104 via the energy store 116 to initiate a shutdown process (where the shutdown process saves the in-flight data and performs other operations), based on differentiating a voltage glitch from an actual loss of power in a power line 112.

Therefore, certain embodiments shown in FIGS. 1-8 provide a memory device in which a power management module in combination with a switch determines whether or not to supply backup power to the non-volatile memory via the energy store for saving the in-flight data and for performing other operations, based on differentiating a voltage glitch from an actual loss of power in a power line from the host. As a result voltage glitches are tolerated while at the same time rapid voltage drops result in backup power being supplied via a capacitor to save in-flight data.

The described components and/or operations may be implemented as a method, apparatus or computer program product using standard programming and/or engineering techniques to produce software, firmware, hardware, or any combination thereof. The described operations may be implemented as code maintained in a "computer readable storage medium" for implementation in certain embodiments or for software simulation of a memory chip for design purposes, where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard drive drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of flowcharts and/or block diagrams may be implemented by computer program instructions.

Figure 9:
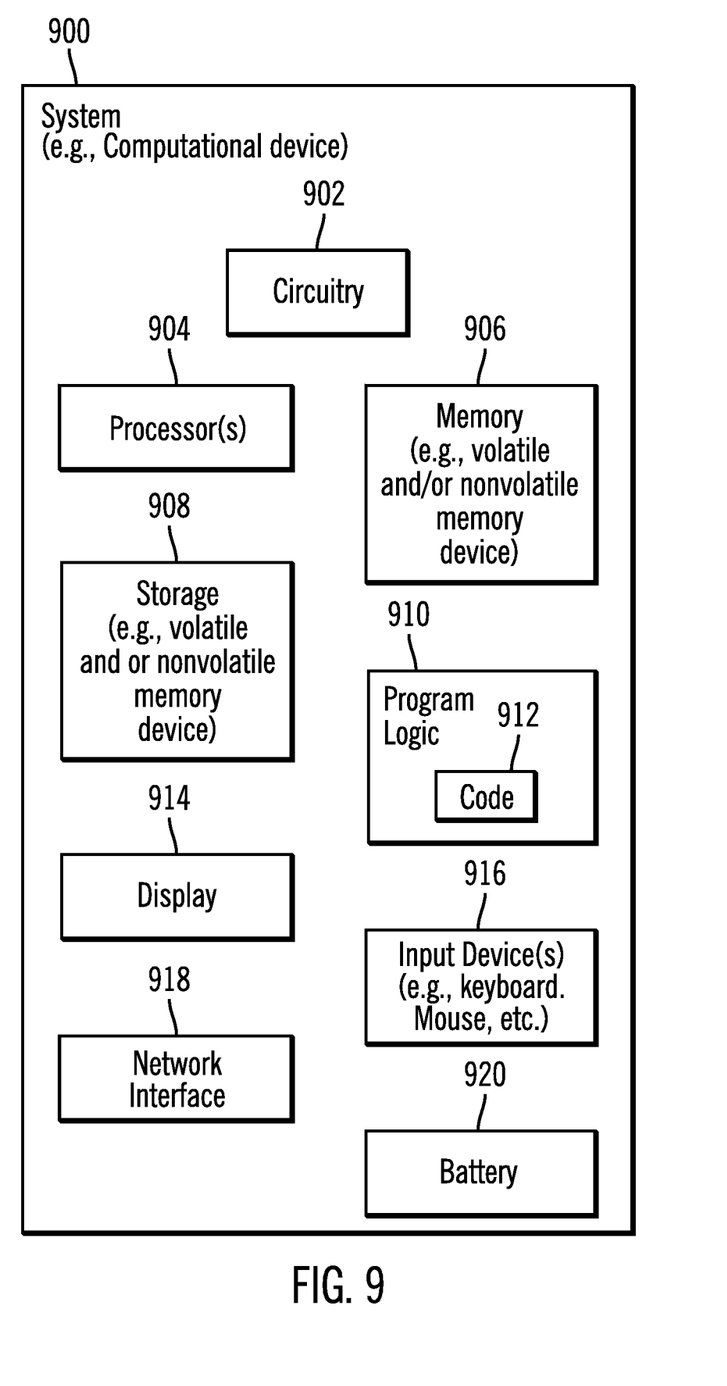
FIG. 9 illustrates a block diagram of a system including a computational device that includes a memory device comprised of non-volatile memory, in accordance with certain embodiments.

FIG. 9 illustrates a block diagram of a system 900 that may include a computational device where a memory device (designed as per the architecture of the memory device 100 shown in FIGS. 1-8) is included in the computational device. For example, in certain embodiments the system 900 may be a computer (e.g., a laptop computer, a desktop computer, a tablet, a cell phone or any other suitable computational device) that has a memory device (designed as per the architecture of memory device 100 shown in FIG. 1) in the computer. The system 900 may include a circuitry 902 that may in certain embodiments include at least a processor 904. The system 900 may also include a memory 906 (e.g., a memory device 100 as per the architecture shown in FIG. 1), and storage 908 (e.g., a memory device 100 as per the architecture shown in FIG. 1). The storage 908 may include a solid state drive, a disk drive, or other drives or devices including a non-volatile memory device (e.g., EEPROM, ROM, PROM, flash, firmware, programmable logic, etc.). The storage 908 may also include a magnetic disk drive, an optical disk drive, a tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902. The system 900 may also include a display 914 (e.g., an liquid crystal display (LCD), a light emitting diode (LED) display, a cathode ray tube (CRT) display, a touchscreen display, or any other suitable display). The system 900 may also include one or more input devices 916, such as, a keyboard, a mouse, a joystick, a trackpad, or any other suitable input devices). In certain embodiments, the display 914 may be coupled to a memory device comprising the storage 924 and/or the memory 906; a network interface 914 may be communicatively coupled to the processor 904; and a battery 920 may be communicatively coupled to the processor. Other components or devices beyond those shown in FIG. 9 may also be found in the system 900.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

EXAMPLES

The following examples pertain to further embodiments.

Example 1 is a memory, comprising: a non-volatile memory; an energy store coupled to an input power module of the non-volatile memory; and a power management module configurable to determine whether or not to supply backup power to the non-volatile memory via the energy store to initiate a shutdown process, based on differentiating a voltage glitch from an actual loss of power in a power line.

In example 2, the subject matter of claim 1 may include that the memory device further comprises a switch coupled to the power line to control transmission of power to the non-volatile memory, wherein operations of the switch are controlled via the power management module.

In example 3, the subject matter of example 2 may include that the power management module is further configurable to: determine whether a voltage drop has occurred, wherein the voltage drop occurs either via the voltage glitch or via the actual loss of power; turn off the switch, in response to determining that the voltage drop has occurred; determine that the actual loss of power has occurred, in response to turning off the switch; and control the energy store to supply the power to the non-volatile memory to save data in flight in the non-volatile memory, in response to determining that the actual loss of power has occurred.

In example 4, the subject matter of example 3 may include that the power management module is further configurable to: maintain the switch in a state in which the power line is able to supply power to the non-volatile memory, in response to determining that no voltage drop has occurred; and preserve energy in a source power rail of the switch for a time interval between the determining of the voltage drop and the determining of the actual power loss.

In example 5, the subject matter of example 4 may include that the power management module is further configurable to: maintain or restore the switch in a state in which the power line is able to supply power to the non-volatile memory, in response to determining that no actual loss of power has occurred.

In example 6, the subject matter of example 2 may include that the non-volatile memory device is a memory board or a storage drive, wherein the non-volatile memory comprises a plurality of non-volatile memory chips, and wherein the energy store is a capacitor that is configurable to store charge.

In example 7, the subject matter of example 2 may include that the switch comprises two MOSFETs with a single gate that is controlled by the power management module, wherein in response to a reverse voltage condition caused by a quick voltage drop, the power management module is configurable to disable the two MOSFETs via the single gate to preserve energy in a source power rail that couples the switch to the non-volatile memory.

In example 8, the subject matter of example 2 may include that the switch comprises a first MOSFETs controlled by a first gate, and a second MOSFET controlled by a second gate; and in response to a reverse voltage condition caused by a quick voltage drop, the power management module is configurable to disable the second MOSFET via the second gate, wherein the first MOSFET is configurable to continue to facilitate charge retention in a source power rail even when the second MOSFET is disabled.

Example 9 is a method, comprising: maintaining a memory device comprising a non-volatile memory and an energy store; and determining, via a power management module of the memory device, whether or not to supply backup power to the non-volatile memory via the energy store to initiate a shutdown process, based on differentiating a voltage glitch from an actual loss of power in a power line.

In example 10, the subject matter example 9 further comprises: controlling, via a switch coupled to the power line, transmission of power to the non-volatile memory, wherein operations of the switch are controlled via the power management module.

In example 11, the subject matter of example 10 further comprises that the power management module further performs: determining whether a voltage drop has occurred, wherein the voltage drop occurs either via the voltage glitch or via the actual loss of power; turning off the switch, in response to determining that the voltage drop has occurred; determining that the actual loss of power has occurred, in response to turning off the switch; controlling the energy store to supply the power to the non-volatile memory to save data in flight in the non-volatile memory, in response to determining that the actual loss of power has occurred.

In example 12, the subject matter of example 11 further comprises that the power management module further performs: maintaining the switch in a state in which the power line is able to supply power to the non-volatile memory, in response to determining that no voltage drop has occurred; and preserving energy in a source power rail of the switch for a time interval between the determining of the voltage drop and the determining of the actual power loss.

In example 13, the subject matter of example 12 further comprises that the power management module further performs: maintaining or restoring the switch in a state in which the power line is able to supply power to the non-volatile memory, in response to determining that no actual loss of power has occurred.

In example 14, the subject matter of example 10 further comprises that the non-volatile memory device is a memory board or a storage drive, wherein the non-volatile memory comprises a plurality of non-volatile memory chips, and wherein the energy store is a capacitor that is configurable to store charge.

In example 15, the subject matter of example 10 further comprises that the switch comprises two MOSFETs that share a single gate that is controlled by the power management module, and wherein in response to a reverse voltage condition caused by a quick voltage drop, the power management module disables the two MOSFETs via the single gate to preserve energy in a source power rail that couples the switch to the non-volatile memory.

In example 16, the subject matter of example 10 further comprises that the switch comprises a first MOSFETs controlled by a first gate, and a second MOSFET controlled by a second gate; and in response to a reverse voltage condition caused by a quick voltage drop, the power management module disables the second MOSFET via the second gate, wherein the first MOSFET continues to facilitate charge retention in a source power rail even when the second MOSFET is disabled.

Example 17 is a computational device, comprising: a processor; and a memory device coupled to the processor, the memory device comprising: a non-volatile memory; an energy store coupled to an input power module of the non-volatile memory; and a power management module configurable to determine whether or not to supply backup power to the non-volatile memory via the energy store to initiate a shutdown process, based on differentiating a voltage glitch from an actual loss of power in a power line.

In example 18, the subject matter of example 17 further comprises that the memory device further comprises: a switch coupled to the power line to control transmission of power to the non-volatile memory, wherein operations of the switch are controlled via the power management module.

In example 19, subject matter of example 18 further comprises that the power management module is further configurable to: determine whether a voltage drop has occurred, wherein the voltage drop occurs either via the voltage glitch or via the actual loss of power; turn off the switch, in response to determining that the voltage drop has occurred; determine that the actual loss of power has occurred, in response to turning off the switch; control the energy store to supply the power to the non-volatile memory to save data in flight in the non-volatile memory, in response to determining that the actual loss of power has occurred.

In example 20, the subject matter of example 19 further comprises that the power management module is further configurable to: maintain the switch in a state in which the power line is able to supply power to the non-volatile memory, in response to determining that no voltage drop has occurred; and preserve energy in a source power rail of the switch for a time interval between the determining of the voltage drop and the determining of the actual power loss.

In example 21, the subject matter of example 20 further comprises that the power management module is further configurable to: maintain or restore the switch in a state in which the power line is able to supply power to the non-volatile memory, in response to determining that no actual loss of power has occurred.

In example 22, the subject matter of example 18 further comprises that the non-volatile memory device is a memory board or a storage drive, wherein the non-volatile memory comprises a plurality of non-volatile memory chips, and wherein the energy store is a capacitor that is configurable to store charge.

In example 23, the subject matter of example 18 further comprises that the switch comprises two MOSFETs with a single gate that is controlled by the power management module, wherein in response to a reverse voltage condition caused by a quick voltage drop, the power management module is configurable to disable the two MOSFETs via the single gate to preserve energy in a source power rail that couples the switch to the non-volatile memory.

In example 24, the subject matter of example 18 further comprises that the switch comprises a first MOSFETs controlled by a first gate, and a second MOSFET controlled by a second gate; and in response to a reverse voltage condition caused by a quick voltage drop, the power management module is configurable to disable the second MOSFET via the second gate, wherein the first MOSFET is configurable to continue to facilitate charge retention in a source power rail even when the second MOSFET is disabled.

In example 25, the subject matter of example 17 further comprises that the computations device comprises one or more of: a display coupled to the memory device; a network interface communicatively coupled to the processor; or a battery communicatively coupled to the processor.

Example 26 is a memory device for storing data, the memory device comprising: a non-volatile memory; an energy store coupled to an input power module of the non-volatile memory; and a power management module configurable to determine whether or not to supply backup power to the non-volatile memory via the energy store to initiate a shutdown process, based on differentiating a voltage glitch from an actual loss of power in a power line.

In example 27, the subject matter of claim 26 may include that the memory device further comprises a switch coupled to the power line to control transmission of power to the non-volatile memory, wherein operations of the switch are controlled via the power management module.

In example 28, the subject matter of example 27 may include that the power management module is further configurable to: determine whether a voltage drop has occurred, wherein the voltage drop occurs either via the voltage glitch or via the actual loss of power; turn off the switch, in response to determining that the voltage drop has occurred; determine that the actual loss of power has occurred, in response to turning off the switch; and control the energy store to supply the power to the non-volatile memory to save data in flight in the non-volatile memory, in response to determining that the actual loss of power has occurred.

In example 29, the subject matter of example 28 may include that the power management module is further configurable to: maintain the switch in a state in which the power line is able to supply power to the non-volatile memory, in response to determining that no voltage drop has occurred; and preserve energy in a source power rail of the switch for a time interval between the determining of the voltage drop and the determining of the actual power loss.

In example 30, the subject matter of example 29 may include that the power management module is further configurable to: maintain or restore the switch in a state in which the power line is able to supply power to the non-volatile memory, in response to determining that no actual loss of power has occurred.

In example 31, the subject matter of example 27 may include that the non-volatile memory device is a memory board or a storage drive, wherein the non-volatile memory comprises a plurality of non-volatile memory chips, and wherein the energy store is a capacitor that is configurable to store charge.

In example 32, the subject matter of example 27 may include that the switch comprises two MOSFETs with a single gate that is controlled by the power management module, wherein in response to a reverse voltage condition caused by a quick voltage drop, the power management module is configurable to disable the two MOSFETs via the single gate to preserve energy in a source power rail that couples the switch to the non-volatile memory.

In example 33, the subject matter of example 27 may include that the switch comprises a first MOSFETs controlled by a first gate, and a second MOSFET controlled by a second gate; and in response to a reverse voltage condition caused by a quick voltage drop, the power management module is configurable to disable the second MOSFET via the second gate, wherein the first MOSFET is configurable to continue to facilitate charge retention in a source power rail even when the second MOSFET is disabled.

Example 34 is a method for management of power loss, the method comprising: maintaining a memory device comprising a non-volatile memory and an energy store; and determining, via a power management module of the memory device, whether or not to supply backup power to the non-volatile memory via the energy store to initiate a shutdown process, based on differentiating a voltage glitch from an actual loss of power in a power line.

In example 35, the subject matter example 34 further comprises: controlling, via a switch coupled to the power line, transmission of power to the non-volatile memory, wherein operations of the switch are controlled via the power management module.

In example 36, the subject matter of example 35 further comprises that the power management module further performs: determining whether a voltage drop has occurred, wherein the voltage drop occurs either via the voltage glitch or via the actual loss of power; turning off the switch, in response to determining that the voltage drop has occurred; determining that the actual loss of power has occurred, in response to turning off the switch; controlling the energy store to supply the power to the non-volatile memory to save data in flight in the non-volatile memory, in response to determining that the actual loss of power has occurred.

In example 37, the subject matter of example 36 further comprises that the power management module further performs: maintaining the switch in a state in which the power line is able to supply power to the non-volatile memory, in response to determining that no voltage drop has occurred; and preserving energy in a source power rail of the switch for a time interval between the determining of the voltage drop and the determining of the actual power loss.

In example 38, the subject matter of example 37 further comprises that the power management module further performs: maintaining or restoring the switch in a state in which the power line is able to supply power to the non-volatile memory, in response to determining that no actual loss of power has occurred.

In example 39, the subject matter of example 35 further comprises that the non-volatile memory device is a memory board or a storage drive, wherein the non-volatile memory comprises a plurality of non-volatile memory chips, and wherein the energy store is a capacitor that is configurable to store charge.

In example 40, the subject matter of example 35 further comprises that the switch comprises two MOSFETs that share a single gate that is controlled by the power management module, and wherein in response to a reverse voltage condition caused by a quick voltage drop, the power management module disables the two MOSFETs via the single gate to preserve energy in a source power rail that couples the switch to the non-volatile memory.

In example 41, the subject matter of example 35 further comprises that the switch comprises a first MOSFETs controlled by a first gate, and a second MOSFET controlled by a second gate; and in response to a reverse voltage condition caused by a quick voltage drop, the power management module disables the second MOSFET via the second gate, wherein the first MOSFET continues to facilitate charge retention in a source power rail even when the second MOSFET is disabled.

Example 42 is a computational device for managing data, the computational device comprising: a processor; and a memory device coupled to the processor, the memory device comprising: a non-volatile memory; an energy store coupled to an input power module of the non-volatile memory; and a power management module configurable to determine whether or not to supply backup power to the non-volatile memory via the energy store to initiate a shutdown process, based on differentiating a voltage glitch from an actual loss of power in a power line.

In example 43, the subject matter of example 42 further comprises that the memory device further comprises: a switch coupled to the power line to control transmission of power to the non-volatile memory, wherein operations of the switch are controlled via the power management module.

In example 44, subject matter of example 43 further comprises that the power management module is further configurable to: determine whether a voltage drop has occurred, wherein the voltage drop occurs either via the voltage glitch or via the actual loss of power; turn off the switch, in response to determining that the voltage drop has occurred; determine that the actual loss of power has occurred, in response to turning off the switch; control the energy store to supply the power to the non-volatile memory to save data in flight in the non-volatile memory, in response to determining that the actual loss of power has occurred.

In example 45, the subject matter of example 44 further comprises that the power management module is further configurable to: maintain the switch in a state in which the power line is able to supply power to the non-volatile memory, in response to determining that no voltage drop has occurred; and preserve energy in a source power rail of the switch for a time interval between the determining of the voltage drop and the determining of the actual power loss.

In example 46, the subject matter of example 45 further comprises that the power management module is further configurable to: maintain or restore the switch in a state in which the power line is able to supply power to the non-volatile memory, in response to determining that no actual loss of power has occurred.

In example 47, the subject matter of example 43 further comprises that the non-volatile memory device is a memory board or a storage drive, wherein the non-volatile memory comprises a plurality of non-volatile memory chips, and wherein the energy store is a capacitor that is configurable to store charge.

In example 48, the subject matter of example 43 further comprises that the switch comprises two MOSFETs with a single gate that is controlled by the power management module, wherein in response to a reverse voltage condition caused by a quick voltage drop, the power management module is configurable to disable the two MOSFETs via the single gate to preserve energy in a source power rail that couples the switch to the non-volatile memory.

In example 49, the subject matter of example 43 further comprises that the switch comprises a first MOSFETs controlled by a first gate, and a second MOSFET controlled by a second gate; and in response to a reverse voltage condition caused by a quick voltage drop, the power management module is configurable to disable the second MOSFET via the second gate, wherein the first MOSFET is configurable to continue to facilitate charge retention in a source power rail even when the second MOSFET is disabled.

In example 50, the subject matter of example 42 further comprises that the computations device comprises one or more of: a display coupled to the memory device; a network interface communicatively coupled to the processor; or a battery communicatively coupled to the processor.

Example 51 is a system, comprising: means for maintaining a memory device comprising a non-volatile memory and an energy store; and means for determining, via a power management module of the memory device, whether or not to supply backup power to the non-volatile memory via the energy store to initiate a shutdown process, based on differentiating a voltage glitch from an actual loss of power in a power line.

In example 52, the subject matter of example 51 further comprises: means for controlling, via a switch coupled to the power line, transmission of power to the non-volatile memory, wherein operations of the switch are controlled via the power management module.

In example 53, the subject matter of example 52 further comprises a power management module comprising: means for determining whether a voltage drop has occurred, wherein the voltage drop occurs either via the voltage glitch or via the actual loss of power: means for turning off the switch, in response to determining that the voltage drop has occurred; means for determining that the actual loss of power has occurred, in response to turning off the switch; means for controlling the energy store to supply the power to the non-volatile memory to save data in flight in the non-volatile memory, in response to determining that the actual loss of power has occurred.

In example 54, the subject matter of example 53 further comprises that the power management module further comprises: means for maintaining the switch in a state in which the power line is able to supply power to the non-volatile memory, in response to determining that no voltage drop has occurred; and means for preserving energy in a source power rail of the switch for a time interval between the determining of the voltage drop and the determining of the actual power loss.

In example 55, the subject matter of example 54 includes that the power management module further comprises: means for maintaining or restoring the switch in a state in which the power line is able to supply power to the non-volatile memory, in response to determining that no actual loss of power has occurred.

In example 56, the subject matter of example 52 further comprises that the non-volatile memory device is a memory board or a storage drive, wherein the non-volatile memory comprises a plurality of non-volatile memory chips, and wherein the energy store is a capacitor that is configurable to store charge.

In example 57, the subject matter of example 52 further comprises that the switch comprises two MOSFETs that share a single gate that is controlled by the power management module, and wherein in response to a reverse voltage condition caused by a quick voltage drop, the power management module disables the two MOSFETs via the single gate to preserve energy in a source power rail that couples the switch to the non-volatile memory.

In example 58, the subject matter of example 52 includes that the switch comprises a first MOSFETs controlled by a first gate, and a second MOSFET controlled by a second gate; an in response to a reverse voltage condition caused by a quick voltage drop, the power management module disables the second MOSFET via the second gate, wherein the first MOSFET continues to facilitate charge retention in a source power rail even when the second MOSFET is disabled.

What is claimed is:

1. A memory device, comprising:
    a non-volatile memory;
    an energy store coupled to an input power module of the non-volatile memory;
    a switch coupled to a power line to control transmission of power to the non-volatile memory; and
    a power management module configurable to:
        determine whether a voltage drop has occurred, wherein the voltage drop occurs either via a voltage glitch or via an actual loss of power;
        turn off the switch, in response to determining that the voltage drop has occurred;
        determine that the actual loss of power has occurred, in response to turning off the switch; and
        control the energy store to supply power to the non-volatile memory, in response to determining that the actual loss of power has occurred.

2. The memory device of claim 1, wherein the power management module is further configurable to:
    maintain the switch in a state in which the power line is able to supply power to the non-volatile memory, in response to determining that no voltage drop has occurred; and
    preserve energy in a source power rail of the switch for a time interval between the determining of the voltage drop and the determining of the actual loss of power.

3. The memory device of claim 1, wherein the power management module is further configurable to:
    maintain or restore the switch in a state in which the power line is able to supply power to the non-volatile memory, in response to determining that no actual loss of power has occurred.

4. The memory device of claim 1, wherein the memory device is a memory board or a storage drive, wherein the non-volatile memory comprises a plurality of non-volatile memory chips, and wherein the energy store is a capacitor that is configurable to store charge.

5. The memory device of claim 1, wherein the switch comprises two MOSFETs with a single gate that is controlled by the power management module, wherein
    in response to a reverse voltage condition caused by a voltage drop detected by the switch, the power management module is configurable to disable the two MOSFETs via the single gate to preserve energy in a source power rail that couples the switch to the non-volatile memory.

6. The memory device of claim 1, wherein:
    the switch comprises a first MOSFET controlled by a first gate, and a second MOSFET controlled by a second gate; and
    in response to a reverse voltage condition caused by a voltage drop detected by the switch, the power management module is configurable to disable the second MOSFET via the second gate.

7. A method, comprising:
    maintaining a memory device comprising a non-volatile memory and an energy store;
    controlling, via a switch coupled to a power line, transmission of power to the non-volatile memory; and
    peforming operations by a power management module of the memory device, the operations comprising:
        determining whether a voltage drop has occurred, wherein the voltage drop occurs either via a voltage glitch or via an actual loss of power;
        turning off the switch, in response to determining that the voltage drop has occurred;
        determining that the actual loss of power has occurred, in response to turning off the switch; and
        controlling the energy store to supply power to the non-volatile memory, in response to determining that the actual loss of power has occurred.

8. The method of claim 7, wherein the power management module further performs operations comprising:
    maintaining the switch in a state in which the power line is able to supply power to the non-volatile memory, in response to determining that no voltage drop has occurred; and
    preserving energy in a source power rail of the switch for a time interval between the determining of the voltage drop and the determining of the actual loss of power.

9. The method of claim 7, wherein the power management module further performs operations comprising:
    maintaining or restoring the switch in a state in which the power line is able to supply power to the non-volatile memory, in response to determining that no actual loss of power has occurred.

10. The method of claim 7, wherein the memory device is a memory board or a storage drive, wherein the non-volatile memory comprises a plurality of non-volatile memory chips, and wherein the energy store is a capacitor that is configurable to store charge.

11. The method of claim 7, wherein the switch comprises two MOSFETs that share a single gate that is controlled by the power management module, and wherein in response to a reverse voltage condition caused by a voltage drop detected by the switch, the power management module disables the two MOSFETs via the single gate to preserve energy in a source power rail that couples the switch to the non-volatile memory.

12. The method of claim 7, wherein:
    the switch comprises a first MOSFET controlled by a first gate, and a second MOSFET controlled by a second gate; and
    in response to a reverse voltage condition caused by a voltage drop detected by the switch, the power management module disables the second MOSFET via the second gate, wherein the first MOSFET continues to facilitate charge retention in a source power rail even when the second MOSFET is disabled.

13. A computational device, comprising:
    a processor; and
    a memory device coupled to the processor, the memory device comprising:
        a non-volatile memory;
        an energy store coupled to an input power module of the non-volatile memory;
        a switch coupled to a power line to control transmission of power to the non-volatile memory; and
        a power management module configurable to:

determine whether a voltage drop has occurred, wherein the voltage drop occurs either via a voltage glitch or via an actual loss of power;

turn off the switch, in response to determining that the voltage drop has occurred;

determine that the actual loss of power has occurred, in response to turning off the switch; and control the energy store to supply power to the non-volatile memory, in response to determining that the actual loss of power has occurred.

14. The computational device of claim 13, wherein the power management module is further configurable to:

maintain the switch in a state in which the power line is able to supply power to the non-volatile memory, in response to determining that no voltage drop has occurred; and preserve energy in a source power rail of the switch for a time interval between the determining of the voltage drop and the determining of the actual loss of power.

15. The computational device of claim 13, wherein the power management module is further configurable to:

maintain or restore the switch in a state in which the power line is able to supply power to the non-volatile memory, in response to determining that no actual loss of power has occurred.

16. The computational device of claim 13, wherein the memory device is a memory board or a storage drive, wherein the non-volatile memory comprises a plurality of non-volatile memory chips, and wherein the energy store is a capacitor that is configurable to store charge.

17. The computational device of claim 13, wherein the switch comprises two MOSFETs with a single gate that is controlled by the power management module, wherein in response to a reverse voltage condition caused by a voltage drop detected by the switch, the power management module is configurable to disable the two MOSFETs via the single gate to preserve energy in a source power rail that couples the switch to the non-volatile memory.

18. The computational device of claim 13, wherein:

the switch comprises a first MOSFET controlled by a first gate, and a second MOSFET controlled by a second gate; and in response to a reverse voltage condition caused by a voltage drop detected by the switch, the power management module is configurable to disable the second MOSFET via the second gate, wherein the first MOSFET is configurable to continue to facilitate charge retention in a source power rail even when the second MOSFET is disabled.

19. The computational device of claim 13, comprising one or more of:

a display coupled to the memory device;

a network interface communicatively coupled to the processor; or a battery communicatively coupled to the processor.

* * * * *